United States Patent
Young et al.

(10) Patent No.: US 10,585,931 B1
(45) Date of Patent: Mar. 10, 2020

(54) DYNAMIC DETERMINATION OF DATA FACETS

(75) Inventors: Jonathan Hood Young, Newton, MA (US); Sid Probstein, Chestnut Hill, MA (US); Rik Tamm-Daniels, Boston, MA (US); William Kimble Johnson, III, Waltham, MA (US)

(73) Assignee: ServiceNow, Inc., Santa Clara, CA (US)

( * ) Notice: Subject to any disclaimer, the term of this patent is extended or adjusted under 35 U.S.C. 154(b) by 478 days.

(21) Appl. No.: 12/353,565

(22) Filed: Jan. 14, 2009

Related U.S. Application Data (60) Provisional application No. 61/022,001, filed on Jan. 18, 2008.

(51) Int. Cl.
- *G06F 16/00* (2019.01)
- *G06F 16/35* (2019.01)
- *G06F 16/45* (2019.01)

(52) U.S. Cl.
CPC .............. *G06F 16/35* (2019.01); *G06F 16/45* (2019.01)

(58) Field of Classification Search
CPC .................................. G06F 16/35; G06F 16/45
See application file for complete search history.

(56) References Cited

U.S. PATENT DOCUMENTS

| | | | |
|---|---|---|---|
| 8,214,345 B2 * | 7/2012 | Torres et al. ................. | 707/706 |
| 2002/0147703 A1 * | 10/2002 | Yu et al. .......................... | 707/2 |
| 2003/0212669 A1 * | 11/2003 | Dedhia et al. .................... | 707/3 |

* cited by examiner

*Primary Examiner* — Usmaan Saeed
*Assistant Examiner* — Paul Kim
(74) *Attorney, Agent, or Firm* — Fletcher Yoder PC (57) ABSTRACT

Documents and data are analyzed to determine one or more data facets. The documents, data and other information contained therein may be presented according to statistically-determined groupings based on the data facets.

33 Claims, 4 Drawing Sheets

```xml
<facets time="0">
<facet field="map">
<stringBucket count="54">Africa</stringBucket>
<stringBucket count="49">Europe</stringBucket>
<stringBucket count="33">Central America and the Caribbea</stringBucket>
<stringBucket count="28">Oceania</stringBucket>
<stringBucket count="22">Asia</stringBucket>
<stringBucket count="19">Middle East</stringBucket>
<stringBucket count="19">Southeast Asia</stringBucket>
<stringBucket count="14">South America</stringBucket>
<stringBucket count="7">Political Map Of the World</stringBucket>
<stringBucket count="5">Antarctic Region</stringBucket>
</facet>
<facet field="religion">
<stringBucket count="115">Other</stringBucket>
<stringBucket count="115">Roman Catholic</stringBucket>
<stringBucket count="105">Muslim</stringBucket>
<stringBucket count="58">None</stringBucket>
<stringBucket count="55">Christian</stringBucket>
<stringBucket count="54">Protestant</stringBucket>
<stringBucket count="41">Other Christian</stringBucket>
<stringBucket count="27">Unspecified</stringBucket>
<stringBucket count="26">Indigenous Beliefs</stringBucket>
<stringBucket count="23">Anglican</stringBucket>
</facet>
<facet field="resource">
<stringBucket count="73">Hydropower</stringBucket>
<stringBucket count="69">Fish</stringBucket>
<stringBucket count="69">Iron Ore</stringBucket>
<stringBucket count="68">Copper</stringBucket>
<stringBucket count="64">Gold</stringBucket>
<stringBucket count="62">Petroleum</stringBucket>
<stringBucket count="61">Natural Gas</stringBucket>
<stringBucket count="59">Timber</stringBucket>
<stringBucket count="50">Coal</stringBucket>
<stringBucket count="50">Zinc</stringBucket>
</facet>
</facets>
```

DYNAMIC DETERMINATION OF DATA FACETS

CROSS-REFERENCE TO RELATED APPLICATIONS

This application claims priority to and the benefits of U.S. provisional patent application Ser. No. 61/022,001, entitled "Dynamic Determination Of Data Facets" and filed Jan. 18, 2008, the entire disclosure of which is incorporated herein by reference.

FIELD OF THE INVENTION

The invention relates generally to techniques for data search and retrieval, and more specifically, to the determination of parameters for classification, organization, presentation and retrieval of data.

BACKGROUND

Data presented to consumers of electronic information is often provided in pure "list" form—that is, as a one-dimensional listing in response to a query. Although much effort goes into determining the contents of the list, the ordering of the results and even the visual presentation of individual items, the consumer must still have some knowledge of the subject matter being searched to make the results meaningful. Attempts to provide general classifications (early implementations of search engines such as Yahoo!, for example) often become outdated, overly burdensome or, even worse, irrelevant.

In an attempt to help consumers direct their searches, many websites (typically those selling electronics, automobiles, books, etc.) categorize their products and associate each product with one or more of these categories. As a result, the data is semi-structured, meaning there are certain data elements that are common to all the products, and the values of these elements can be used to classify and select subsets of the products. One example can be seen on many consumer-electronics websites that sell computers. It is common to classify computers as either notebooks or desktops, by price (e.g., <$1000, between $1000 and $2000, and >$2000), screen size, processing power, weight and/or projected use (business, personal, gaming, graphical design). Each of these categories is referred to as a "facet" or "dimension" that can be used to assist the consumer in narrowing down his search using known data elements prior to presenting the results of a search query.

While facet-based searching provides a significant improvement over conventional query/result methods, it is not without its drawbacks. In particular, current techniques for implementing faceted-based search require a significant amount of work to determine the facets long before a website is implemented. Likewise, it is difficult to change the facets as the underlying data and queries evolve without disrupting or modifying the functionality of the search application that acts on the data.

What is needed, therefore, is a method and supporting systems for analyzing data and automatically determining data facets for use as search categories.

SUMMARY OF THE INVENTION

Embodiments of the invention provide methods and technical implementations of systems for gathering and assessing large amounts of data to identify data facets that can be used to classify data and help users narrow search queries. Assessing the data may include reviewing structured and/or semi-structured data that is typically tagged with a property, as well as reviewing query logs (both submitted queries and query results). Probabilistic techniques are preferably used to select "good" facets (e.g., those that segment the data into a well-distributed set of groups) while maintaining a balance between the number of facets and the number of strata within each facet. Because the facets may include discrete values, continuous numeric values (either evenly distributed or skewed) and/or hierarchical values, embodiments of the invention also facilitate determining optimal ranges and groupings of the facets. White lists and black lists may also be used to ensure that a particular field is either used or avoided.

In one aspect, a method for dynamically determining data facets includes receiving a dataset of information that is organized into a plurality of fields (which may be structured, semi-structured, and/or unstructured). Each field has values associated with it for each information element, and the information is analyzed to determine distribution statistics for the fields. Based on the statistics, fields are selected as data facets that may be used to categorize the dataset and facilitate execution of search queries against the dataset. For example, the facets can improve the user experience by being presented as links labeled with a specific term to limit (or refine) the search, or a link (labeled, e.g., "(remove Price restriction)") that broadens the search parameters.

In some embodiments, query logs generated in response to queries submitted against the dataset may be incorporated into the analysis such that the distribution statistics reflect these previous queries. A subset of the dataset may be identified and used to represent the dataset as a whole, in which case the analysis is limited set to the information contained in the subset. The information may be stored in a document repository, database, search repository or other form of physical and/or virtual storage. The method may also include the processing of a search query, in which information is retrieved from the dataset based on a correlation between components of the search query and the data facets. In some cases, the facets may then be ranked. The ranking may be based on the distribution statistics, query logs, or other attributes of the fields and used to present information from the dataset such that the information is grouped and ordered by the ranked facets.

In some implementations, the data facets may be incorporated into source code (e.g., XML, HTML or other structured markup language) of an application, and the presentation of that application then changes based on the newly identified or modified data facets. The data facets may also include item groupings, which may be other facets or, in some cases sub-categories. The groupings may depend, for example, on a statistical distribution of documents and/or data. The groupings may be linear (e.g., of equal range), logarithmic, or, in some cases based on data clusters.

In another aspect, a system for dynamically determining data facets includes a data repository for storing information to be searched, wherein the information is organized into fields and the fields have associated values. The system also includes a facet recommendation engine for (i) analyzing the information to determine distribution statistics for the fields, and (ii) based on the statistics, selecting fields as data facets to be used to categorize the dataset.

In an other aspect the instructions implement and/or performing the methods described in the preceding paragraphs. In particular, the functionality of a method of the present invention may be embedded on a computer-readable medium, such as, but not limited to, a floppy disk, a hard disk, an optical disk, a magnetic tape, a PROM, an EPROM, CD-ROM, or DVD-ROM or downloaded from a server. The functionality of the techniques may be embedded on the computer-readable medium in any number of computer-readable instructions, or languages such as, for example, FORTRAN, PASCAL, C, C++, Java, PERL, C#, Tcl, BASIC and assembly language. Further, the computer-readable instructions may, for example, be written in a script, macro, or functionally embedded in commercially available software (such as, e.g., EXCEL or VISUAL BASIC).

Other aspects and advantages of the invention will become apparent from the following drawings, detailed description, and claims, all of which illustrate the principles of the invention, by way of example only.

DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 3 is an example of an XML listing of facets and facet values.

DETAILED DESCRIPTION

Figure 1:
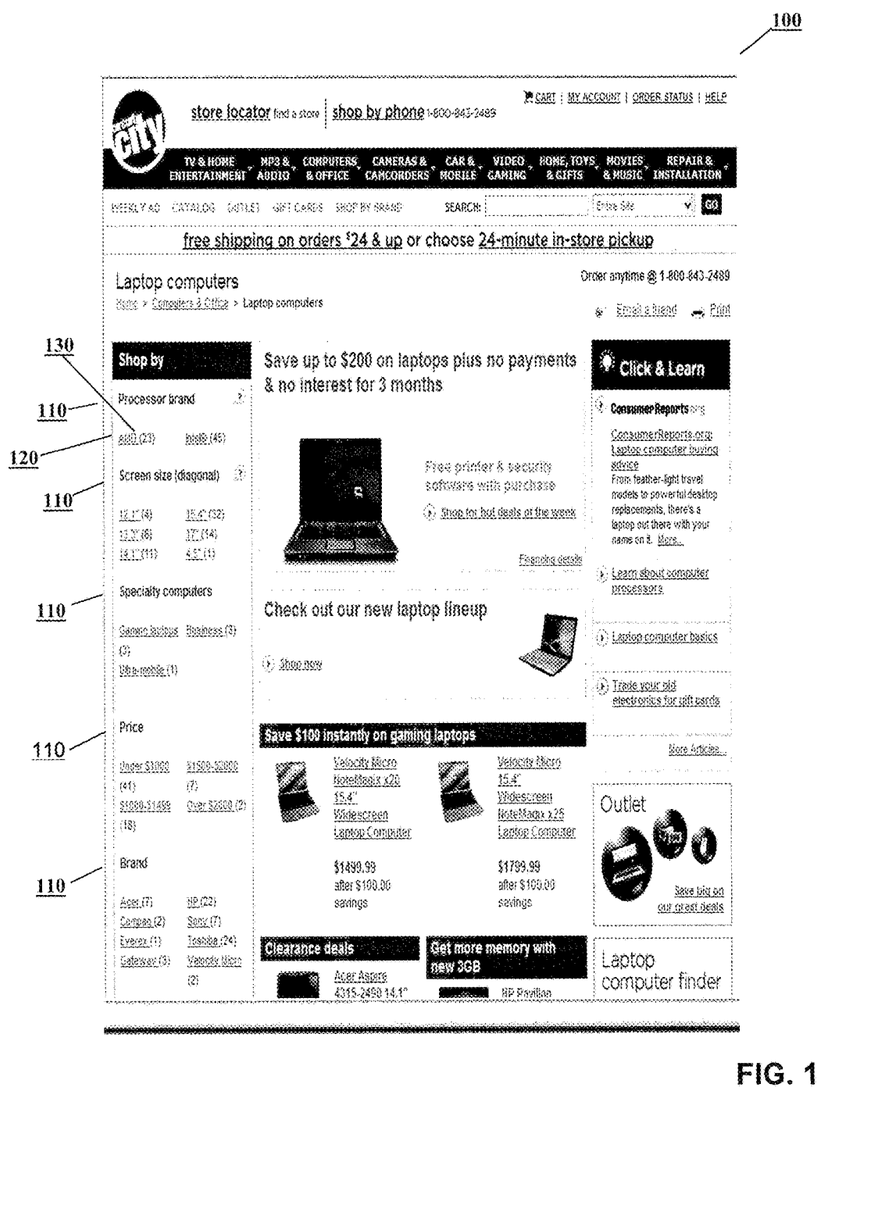
FIG. 1 is a screen-shot from a web-based storefront illustrating the use of data facets to group products, which may be implemented using various embodiments of the invention.

Consumer websites often facilitate product searching using data facets. Conventional methods of implementing data-faceted search require manual analysis and selection of the data facets based on known, fielded properties that exist in the data. Referring to FIG. 1, for example, a web page 100 a collection of laptop computers available at a retail store and organized by five data facets 110. Specifically, the available laptops are grouped according to processor type, screen size, proposed use, price and manufacturer, such that visitors to the webpage can narrow their searches for a particular product meeting certain criteria. Furthermore, each data facet includes not only values (e.g., groupings) 120 for each facet 110, but the number of items 130 that meet that particular criteria. Visitors select a grouping 120 based on individual preferences, and the selection is sent to an underlying search engine which applies the values as filter criteria in a subsequent query that returns a list of products matching the criteria.

Conventional techniques for determining and presenting facets of structured or unstructured data involve significant manual effort. Typically, technicians review product descriptions, metadata, search logs and other information to select a handful of aggregate groupings to use as selection facets. In practice, once these data facets are selected, they are hard-coded into web page designs and data structures, which makes expansion and/or modification of the data facets difficult and time consuming. In certain environments (e.g., real-time news stories, sports, financial markets, etc.) the data facets may change many times throughout a day, in which case manual changes to facet lists is futile.

In contrast to the manual approach described above, embodiments of the invention facilitate the analysis of a set of documents and/or data records (from a database, search engine index, and/or any other document/data repository, collectively referred to as a "dataset") and the automated selection and recommendation of a set of fields to be used as data facets. Generally, the technique can be implemented in two different ways—either offline, where the dataset is analyzed but the results do not immediately affect the application supported by the dataset, or online, where the results automatically influence the presentation of data facets in real time. In the latter implementation, a facet-finder recommendation engine provides the data fields to a website configuration tool, thereby creating an updated user interface that presents the products and categories to users. In some embodiments, a feedback loop provides query results and usage statistics based on previously selected facets as input into the analysis step for continuous improvement.

Figure 2:
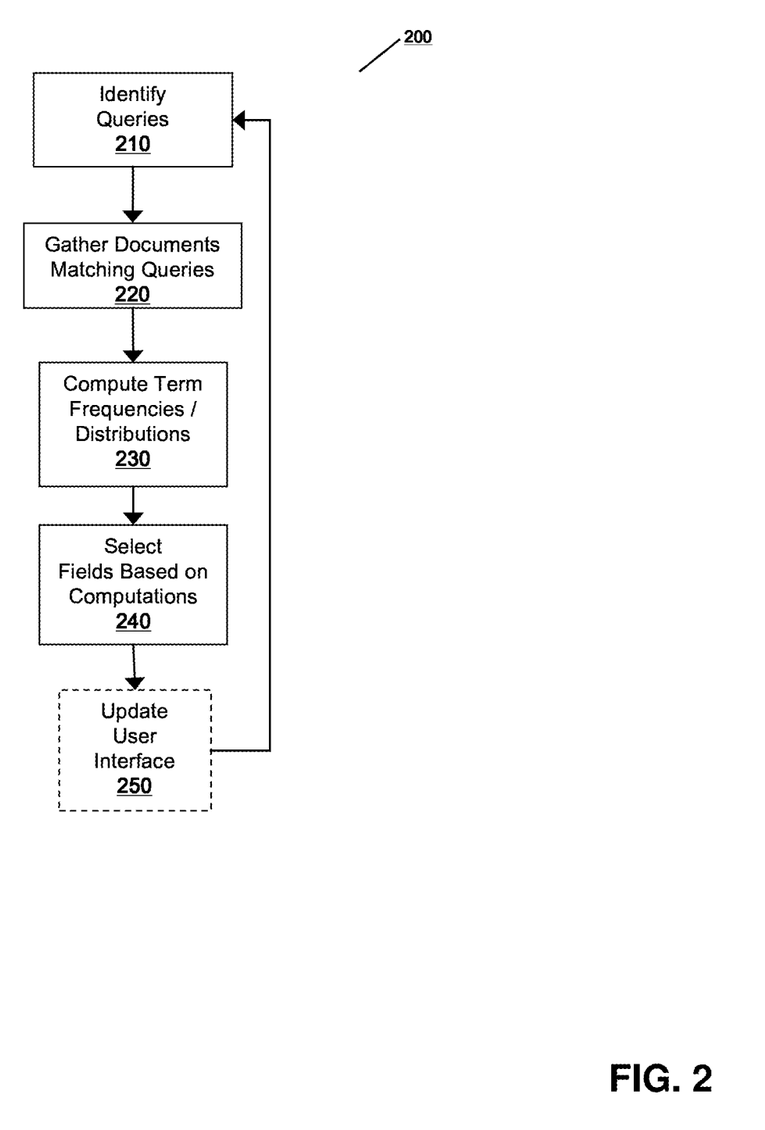
FIG. 2 is a flow chart depicting a process for automatically discovering data facets in accordance with an embodiment of the invention.

FIG. 2 illustrates a process 200 for determining optimal or near-optimal facets based on an underlying dataset. Initially, a query or set of queries is identified (STEP 210) that represents a particular user group or selection criteria to narrow the set of documents being identified. In some implementations, a subset of the dataset may be identified and used, for purposes of facet identification, as a representation of the entire dataset. Certain documents of the dataset may, for example, be identified as more important (based on date submitted, length, author, frequency of use, user feedback, etc.) and used either exclusively during the analysis step, or weighted such that they have a greater influence on term distributions and frequencies. In such cases, the processing resources needed to analyze the dataset and determine appropriate facets may be significantly reduced. In some embodiments, however, this step may be skipped, and the entire dataset may be used.

The dataset and/or its constituent documents may be structured (e.g., pulled from a relational database), semi-structured (fielded with values), or unstructured. Representative examples include a music catalog in which songs and albums have attributes such as artist, title, length, genre, and release date; a recipe collection in which recipes are associated with a type of cuisine, main ingredients, cooking style and/or a holiday; travel information that may be organized by destinations, prices, and include articles by authors or publications; regulatory documents that include product and part codes, machine types, expiration dates, filing dates and submission data; and images that may be tagged with the name of an artist, date, style, type of image, artistic movement, major colors, theme, etc. In each case, a facet recommendation engine analyzes the data (or, in some cases a defined subset of the data) and computes term frequencies and/or distributions (STEP 230) to determine potential facets that may be used to cluster the data or documents into meaningful classifications. Based on the computed frequencies, one or more fields or data values are selected as data facets.

In general, a field is a good candidate for use as a facet if a large percentage (e.g., >95%) of the documents include a value for the field, since using fields with a lower population percentage can result in a significant amount of data being ignored, and therefore not included in the search results. Furthermore, the field should contain a relatively small number of terms (as compared to the total number of documents or records being indexed). As an example, a field having between 10 and 50 values for a dataset containing 1000-5000 items is a good candidate for a data facet. The values in the dataset need not have been distributed evenly or according to a predictable pattern, and in fact if a small number of the values represent a high percentage of the items, the field may be an even stronger candidate for use as a facet. Furthermore, it is preferable for the fields used as facets to be mutually exclusive—e.g., they do not overlap and are not correlated with each other—and the values of one field should not be discernible or predictable from values in other fields.

Typically, date fields and numeric fields (e.g., prices) are good candidates for facets. However, fields that contain highly unique numbers (e.g., SKUs, ISBNs, SSNs, etc.) are usually poor candidates for facets, as there is no discernable logic for grouping products, documents or records based on these numbers. As such, the system may, in some cases, identify and reject those facets that represent ID-type data having only one or two items in each (or some high percentage, e.g., >95%) of the groupings.

The grouping of numeric values need not be linear. In some cases, especially with products exhibiting high price variability, other classifications may be more beneficial. For example, when presenting memorabilia in an online auction, the prices may range from a few dollars for common merchandise (e.g., pins or hats that were produced in great numbers) to tens of thousands for one-of-a-kind, autographed, limited-edition paraphernalia (e.g., signed artwork, mint-condition coins, etc.). In these cases, the ranges may be logarithmic (or some combination of linear and logarithmic) such that the price facet is presented as $0-$10; $10-$100; $100-$1,000; $1,000-$5,000; and >$5,000.

While many facet groupings that include numeric ranges may be logarithmic (e.g., 1-10, 10-100, and 100-1000) or linear, other implementations compute ranges by dividing the actual population of data values into "bins" of equal (or approximately equal) numbers of items. This approach is especially useful when values "clump" together. Using this method allows for the detection of outliers by statistical testing or simply by detecting empty bins adjacent to the top and/or bottom bin, where the extreme bin is smaller than a configurable percentage (e.g., 5%) of the total values. For example, if the linearly spaced bins from 0 to 1000 contain 1, 0, 0, 0, 100, 0, 0, 0, 0, and 1 values, and the middle bin contains values ranging from 500 to 600 (min and max), bins corresponding to "less than 500", "500-510", . . . , 590-600", and "greater than 600" may be created.

Once a set of fields has been identified as potential facets, the above criteria are used to determine which fields are "good" facets (STEP 240). In one example, each field may be scored and/or ranked according to the number of values in the field, the distribution of the values across the entire dataset, the frequency the field is included in a search, etc. If the analysis is performed offline, recommended facets can be determined for an entire repository and the ranked fields then displayed to a system designer or programmer using a facet-recommendation user interface, thus facilitating the selection of facets from the set of recommended facets. In some instances, the user interface also allows the designer to reorder facets if, for example, the ordering and/or placement is deemed to be important. The facet recommendation process may also be performed for a single query (or set of queries) such that the presentation of the search interface includes only those facets deemed highly relevant to the current (or fairly recent) search log.

If the process is implemented online, the fields may be dynamically ranked using the dataset as a reference. In some cases, a subset of the dataset (e.g., the 500 most requested documents, the 100 most recently added documents, etc.) may be used to determine the potential facets. The recommended facets are then supplied to a web-design application using, for example, XML format (or other markup language) with each facet being represented using a unique tag. As a result, web forms may be created automatically, using the dynamically created facets as categories for documents as presented to the users (STEP 250). Similar to offline mode, the facets may be determined based on an analysis of the current query (by, for example, parsing the query string into component terms and searching the data store for the terms) or recent queries. An example of an XML listing of facets and facet values is illustrated in FIG. 3.

In each implementation, query logs may be included in the analysis to capture user interactions with the dataset. For example, if users continually submit queries based on processor speed or operating system (which may not be immediately apparent as important distinguishing factors), these fields may be added as facets, even though the initial analysis indicated they would be poor facets. As a result, fields that otherwise would be overlooked can become important data facets for subsequent searching and retrieval. In this manner, a feedback loop may be used to capture the ongoing performance of the current facet set. Facet performance may be measured based on, for example, the frequency with which queries are submitted using the facet, the percentage of total queries using the facet, the percentage of queries submitted using the facet that are not immediately followed by other queries (i.e., it is likely that the result included the document or product the user was looking for) as well as other factors. Facets may then be added or removed based on the feedback.

Similar to limiting the sample of documents used to determine the facets, one or more subsets of query logs may also be identified and used to select (or help select) data facets. For example, more recent queries (e.g., those submitted in the past week) may provide greater insight into current search trends, and therefore be used exclusively. In other cases, statistical samplings may be used from different time periods, days of the week, seasons, etc. to obtain an accurate representation of how users interact with the dataset. A large set of search queries submitted in the weeks leading up to Christmas may be selected to identify data facets relating to toys, for example.

Figure 4:
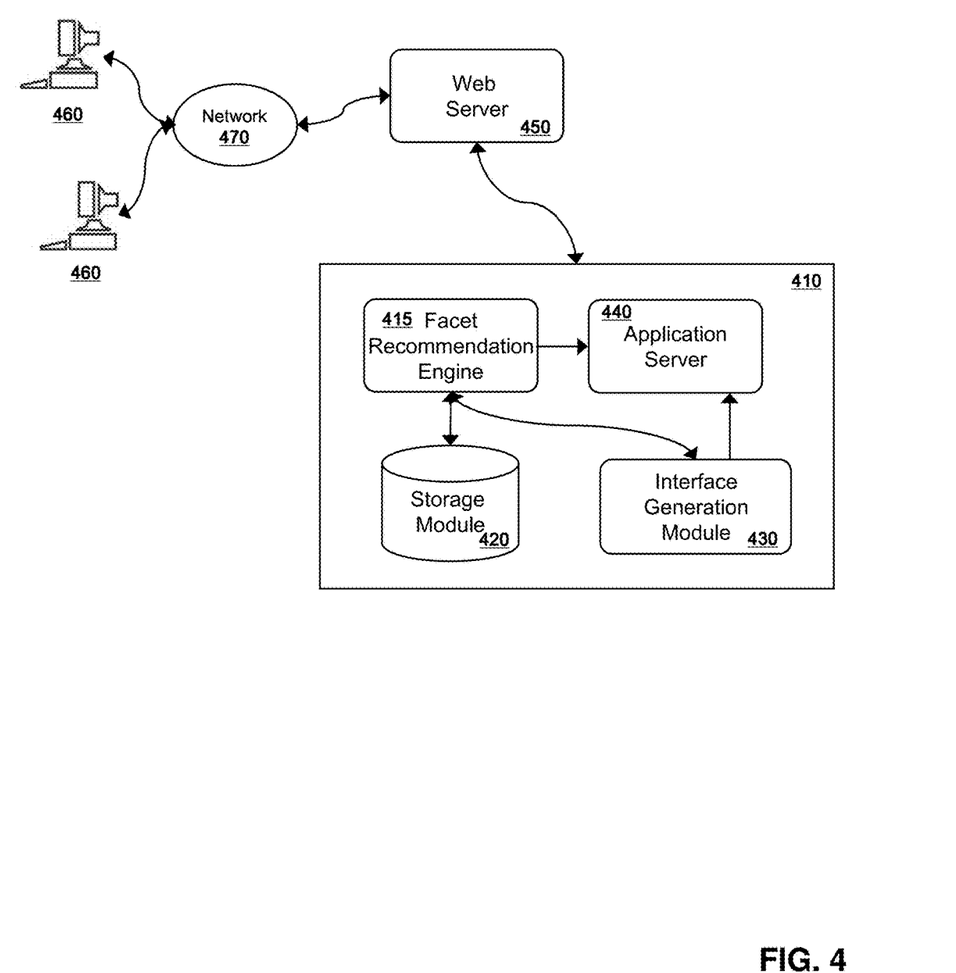
FIG. 4 schematically depicts a system for automatically discovering data facets in accordance with an embodiment of the invention.

Referring to FIG. 4, a system 410 for implementing the techniques described above includes a facet recommendation engine 415 and a data-storage module 420. In some embodiments, the system includes an interface-generation module. The facet recommendation engine 415 provides the application processing component for determining desirable data facets as described above. In one embodiment, the facet recommendation engine 415 includes programming instructions for evaluating large amounts of data and documents, calculating field and value distributions and ranges and recommending which fields to use as data facets. The engine is preferably implemented on one or more server class computers that have sufficient memory, data storage, and processing power and that run a server class operating system (e.g. SUN Solaris, GNU/Linux, MICROSOFT WINDOWS 2000, and later versions, or other such operating system). Other types of system hardware and software can also be used, depending on the capacity of the device, the number of users and the amount of data received. For example, the server may be part of a server farm or server network, which is a logical group of one or more servers. As another example, there may be multiple servers associated with or connected to each other, or multiple servers may operate independently but with shared data. As is typical in large-scale systems, application software can be implemented in components, with different components running on different server computers, on the same server, or some combination.

The data-storage module 420 (or modules) stores the data and/or documents being analyzed by the facet recommendation engine 415 and subsequently searched. For instance, the data repository may store information relating to products, documents, people, and/or transactions against which users submit search queries. Examples of databases that may be used to implement this functionality include the MySQL Database Server by Sun Microsystems, the PostgreSQL Database Server by the PostgreSQL Global Development Group of Berkeley, Calif., and the ORACLE Database Server offered by ORACLE Corp. of Redwood Shores, Calif.

In embodiments in which the facets are automatically incorporated into the web pages, an interface-generation module 430 generates the structured, tagged source code for integration into the application(s) operating on an application server 440. In implementations in which users can manually modify webpage source code to implement newly discovered or modified facets, one or more clients 460 may be used to access the application server 440 via a web server 450. Such implementations may include a design interface for providing the recommended facets to a web design application for implementing the recommendations. The clients 460 are preferably implemented using software running on a personal or professional grade computer workstation (e.g., a PC with an INTEL processor or an APPLE MACINTOSH) capable of running such operating systems as the MICROSOFT WINDOWS family of operating systems from Microsoft Corporation of Redmond, Wash., the MACINTOSH OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The client 460 can also be implemented on such hardware as a smart or dumb terminal, network computer, wireless device, personal data assistant, information appliance, workstation, minicomputer, mainframe computer, or other computing device, that is operated as a general purpose computer or a special purpose hardware device solely used for serving as a client in the system.

The client 460 may include client interface software for facilitating the review and selection of data facets as determined by the facet recommendation engine 415, and may be implemented in various forms, for example, in the form of a Java applet that is downloaded to the client and runs in conjunction with a web browser. Alternatively, the client software may be in the form of a standalone application, implemented in a language such as Java, C++, C#, Visual-Basic or in native processor-executable code. In one embodiment, if executing on the client, the client software opens a network connection to the server over a communications network and communicates via that connection to the server.

A communications network 470 connects the clients 460 with the server(s) 450, 440. The communication may take place via any media such as standard telephone lines, LAN or WAN links (e.g., T1, T3, 56 kb, X.25), broadband connections (ISDN, Frame Relay, ATM), wireless links, and so on. Preferably, the network can carry TCP/IP protocol communications, and HTTP/HTTPS requests made by the client software and the connection between the client software and the server can be communicated over such TCP/IP networks. The type of network is not a limitation, however, and any suitable network may be used. Typical examples of networks that can serve as the communications network include a wireless or wired Ethernet-based intranet, a local or wide-area network (LAN or WAN), and/or the global communications network known as the Internet, which may accommodate many different communications media and protocols.

The modules described throughout the specification can be implemented in whole or in part as a software program (or programs) operating on one or more processors using any suitable programming language or languages (C++, C#, java, Visual Basic, LISP, BASIC, PERL, etc.) and/or as a hardware device (e.g., ASIC, FPGA, processor, memory, storage and the like).

The invention can be embodied in other specific forms without departing from the spirit or essential characteristics thereof. The foregoing embodiments are therefore to be considered in all respects illustrative rather than limiting on the invention described herein.

What is claimed is:

1. A method executed by one or more processors for dynamically determining data facets to categorize a dataset for searching, the method comprising:
    receiving the dataset, from a data repository, comprising information to be searched, where the information is organized into a plurality of records of items to be identified in a search, each record comprising a plurality of attribute fields, each attribute field in a record having one or more values;
    computationally analyzing the information to determine distribution statistics for a selected plurality of the attribute fields and the values from the plurality of records for the selected plurality of the attribute fields;
    selecting, based on a number of records having values for an attribute field and based on a number of terms used as values in the attribute field compared to a number of records, a subset of the selected plurality of the attribute fields to be used as data facets, the selected subset including a plurality of the attribute fields;
    based on the distribution statistics, determining a plurality of value groupings for at least one of the data facets, each of the value groupings for a data facet being specified by plural terms used as values in the attribute field corresponding to the data facet; and
    causing to be presented in a display the selected data facets and, in association with respective data facets, the terms specifying the determined value groupings, as search data facets to categorize the dataset during a search.

2. The method of claim 1 further comprising:
    receiving query logs generated in response to queries submitted against the dataset; and
    incorporating the query logs into the analysis step such that the distribution statistics reflect previous queries submitted against the dataset.

3. The method of claim 1 further comprising identifying a subset of the dataset and limiting the analysis to only the information contained in the subset.

4. The method of claim 1 wherein the information is one or more of structured data, semi-structured data, and unstructured data.

5. The method of claim 1 further comprising:
    receiving a search query; and
    retrieving information from the dataset based on a correlation between components of the search query and the data facets.

6. The method of claim 1 further comprising:
generating structured source code including the data facets; and
incorporating the structured source code into an existing presentation application, such that the visual presentation of the application is based at least in part on the data facets.

7. The method of claim 1 further comprising ranking the data facets according to one or more attributes of the distribution statistics and presenting the data facets within an application according to such ranking.

8. The method of claim 1 wherein the value groupings are linearly organized.

9. The method of claim 1 wherein the value groupings are logarithmically organized.

10. The method of claim 1 wherein the value groupings are organized based on data clusters.

11. A computer hardware system for dynamically determining data facets to categorize a dataset for searching, the computer hardware system comprising:
a data repository storing information to be searched, the information being organized into a plurality of records of items to be identified in a search, each record comprising a plurality of attribute fields, each attribute field in a record having one or more values; and
a facet recommendation engine that:
analyzes the information to determine distribution statistics for a selected plurality of the attribute fields and the values from the plurality of records for the selected plurality of the attribute fields,
selects, based on a number of records having values for an attribute field and based on a number of terms used as values in the attribute field compared to a number of records, a subset of the selected plurality of the attribute fields to be used as data facets, the selected subset including a plurality of the attribute fields,
based on the distribution statistics, determines a plurality of value groupings for at least one of the data facets, each of the value groupings for a data facet being specified by plural terms used as values in the attribute field corresponding to the data facet, and
causes the selected data facets and, in association with respective data facets, the terms specifying the determined value groupings, to be presented as search data facets to categorize the dataset during a search.

12. The computer hardware system of claim 11 wherein the data repository further stores query logs generated in response to queries submitted against the information being searched and the facet recommendation engine incorporates the query logs into the analysis step such that the distribution statistics reflect previous queries submitted against the information.

13. The computer hardware system of claim 11 further comprising an interface-generation module that generates structured source code including the data facets and incorporates the structured source code into an existing presentation application, such that the visual presentation of the application is based at least in part on the recommended data facets.

14. A non-transitory computer-readable program medium having portions embedded thereon for dynamically determining data facets to categorize a dataset for searching, the program portions comprising instructions for:
receiving the dataset, from a data repository, comprising information to be searched, where the information is organized into a plurality of records of items to be identified in a search, each record comprising a plurality of attribute fields, each attribute field in a record having one or more values;
computationally analyzing the information to determine distribution statistics for a selected plurality of the attribute fields and the values from the plurality of records for the selected plurality of the attribute fields;
selecting, based on a number of records having values for an attribute field and based on a number of terms used as values in the attribute field compared to a number of records, a subset of the selected plurality of the attribute fields to be used as data facets, the selected subset including a plurality of the attribute fields;
based on the distribution statistics, determining a plurality of value groupings for at least one of the data facets, each of the value groupings for a data facet being specified by plural terms used as values in the attribute field corresponding to the data facet; and
causing to be presented in a display the selected data facets and, in association with respective data facets, the terms specifying the determined value groupings, as search data facets to categorize the dataset during a search.

15. The computer-readable medium of claim 14 wherein the program portions further comprise instructions for:
receiving query logs generated in response to queries submitted against the dataset; and
incorporating the query logs into the analysis step such that the distribution statistics reflect previous queries submitted against the dataset.

16. The computer-readable medium of claim 14 wherein the program portions further comprise instructions for identifying a subset of the dataset and limiting the analysis set to only the information contained in the subset.

17. The computer-readable medium of claim 14 wherein the program portions further comprise instructions for:
receiving a search query; and
retrieving information from the dataset based on a correlation between components of the search query and the data facets.

18. The computer-readable medium of claim 14 wherein the program portions further comprise instructions for:
generating structured source code including the data facets; and
incorporating the structured source code into an existing presentation application, such that the visual presentation of the application is based at least in part on the data facets.

19. The method of claim 1 further comprising receiving a query and identifying a subset of the dataset based on the query and subsequently computationally analyzing information within the subset.

20. The computer hardware system of claim 11 wherein the facet recommendation engine further receives a query and identifies a subset of the dataset based on the query and subsequently computationally analyzes the information within the subset.

21. The computer-readable medium of claim 14, wherein the program portions further comprise instructions for identifying a subset of the dataset based on a query and subsequently computationally analyzing information within the subset.

22. The method of claim 1 further comprising responding to user selection of presented data facets and value groupings by restricting the data set to a subset that contains values in the selected value groupings of the selected data facet.

23. The computer hardware system of claim 11, wherein the facet recommendation engine further responds to user selection of presented data facets and value groupings by restricting the data set to a subset that contains values in the selected value groupings of the selected data facet.

24. The computer-readable medium of claim 14, wherein the program portions further comprise instructions for responding to user selection of presented data facets and value groupings by restricting the data set to a subset that contains values in the selected value groupings of the selected data facet.

25. A method executed by one or more processors, the method comprising:
computationally analyzing a dataset of items including documents or records or both documents and records, the dataset being organized into a plurality of fields, to determine distribution statistics for one or more of the fields;
selecting, based on a number of items having values for a field and based on a number of different values in the field compared to the number of items, a subset of the plurality of fields as one or more data facets for narrowing queries related to the dataset;
for each data facet of the one or more data facets, determining, based on the distribution statistics, one or more item groupings for the each facet, each of the one or more item groupings being specified by plural values in the field corresponding to the data facet;
causing to be presented in a display the selected data facets and, in association with respective data facets, the values specifying the determined item groupings, as search data facets to categorize the dataset during a search; and
responding to a user's selection of an item grouping by narrowing a set of query results to a subset of results that contain values in the selected item grouping.

26. The method of claim 25, wherein the analyzing, selecting and determining are performed by a facet recommendation engine operating on the one or more processors.

27. The method of claim 25, wherein the dataset of items is based on a current query.

28. The method of claim 25, further comprising receiving a current query, identifying the dataset based on the current query, and subsequently performing the computationally analyzing a dataset and the selecting a subset of the plurality of fields as one or more data facets.

29. The method of claim 25, wherein the performing the computationally analyzing a dataset and the selecting a subset of the plurality of fields as one or more data facets are performed before executing a current query in response to which the selected data facets are caused to be presented in the display.

30. The method of claim 25, further comprising ranking the data facets according to one or more attributes of the distribution statistics and presenting the data facets within an application according to such ranking.

31. The method of claim 25, further comprising:
receiving query logs generated in response to queries submitted against the dataset; and
incorporating the query logs into the distribution statistics to reflect previous queries submitted against the dataset.

32. The method of claim 25, further comprising:
receiving a search query; and
retrieving information from the dataset based on a correlation between components of the search query and the data facets.

33. The method of claim 25, further comprising:
generating structured source code including the data facets; and
incorporating the structured source code into an existing presentation application, such that the visual presentation of the application is based at least in part on the data facets.

* * * * *